(12) United States Patent
Amemiya et al.

(10) Patent No.: US 7,139,850 B2
(45) Date of Patent: Nov. 21, 2006

(54) SYSTEM FOR PROCESSING PROGRAMMABLE BUTTONS USING SYSTEM INTERRUPTS

(75) Inventors: Takeshi Amemiya, Los Gatos, CA (US); Tariq Mustafa, Fremont, CA (US); Uday A. Prabhune, San Jose, CA (US); Rajesh Sundaram, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 226 days.

(21) Appl. No.: 10/176,967

(22) Filed: Jun. 21, 2002

(65) Prior Publication Data

US 2003/0236935 A1    Dec. 25, 2003

(51) Int. Cl.
G06F 3/00    (2006.01)

(52) U.S. Cl. .............. 710/48; 710/36; 710/72; 710/73; 710/266; 345/172

(58) Field of Classification Search .......... 710/268, 710/266, 260, 48, 67, 72–73; 713/100; 345/773, 345/172; 341/22; 708/142, 130
See application file for complete search history.

(56) References Cited

U.S. PATENT DOCUMENTS

| | | | | |
|---|---|---|---|---|
| 3,706,973 A * | 12/1972 | Acquadro et al. | .......... | 345/172 |
| 4,763,252 A * | 8/1988 | Rose | .......... | 345/168 |
| 4,853,888 A * | 8/1989 | Lata et al. | .......... | 345/172 |
| 4,937,778 A * | 6/1990 | Wolf et al. | .......... | 710/67 |
| 4,964,075 A * | 10/1990 | Shaver et al. | .......... | 710/67 |
| 5,124,689 A * | 6/1992 | Franz et al. | .......... | 345/160 |
| 5,287,526 A * | 2/1994 | Wolf et al. | .......... | 708/146 |
| 5,404,321 A * | 4/1995 | Mattox | .......... | 708/131 |
| 5,485,614 A * | 1/1996 | Kocis et al. | .......... | 345/168 |
| 5,628,686 A * | 5/1997 | Svancarek et al. | .......... | 463/36 |
| 5,867,729 A * | 2/1999 | Swonk | .......... | 710/8 |
| 5,900,875 A * | 5/1999 | Haitani et al. | .......... | 715/840 |
| 5,937,200 A * | 8/1999 | Frid et al. | .......... | 710/264 |
| 5,990,872 A * | 11/1999 | Jorgenson et al. | .......... | 345/168 |
| 6,038,671 A * | 3/2000 | Tran et al. | .......... | 713/300 |
| 6,105,142 A * | 8/2000 | Goff et al. | .......... | 713/324 |
| 6,131,131 A * | 10/2000 | Bassman et al. | .......... | 710/15 |
| 6,198,474 B1 * | 3/2001 | Roylance | .......... | 345/168 |
| 6,209,034 B1 * | 3/2001 | Gladwin et al. | .......... | 709/227 |
| 6,256,020 B1 * | 7/2001 | Pabon et al. | .......... | 345/172 |

(Continued)

FOREIGN PATENT DOCUMENTS

JP    05-158884    6/1993

(Continued)

OTHER PUBLICATIONS

"Personal Computer Waking Up Scheme for ACPI Operating System," Dec. 1, 1998, IBM Research Disclosure, UK, vol. 41, Issue No. 416.*

(Continued)

*Primary Examiner*—Mark H. Rinehart
*Assistant Examiner*—Matthew Spittle
(74) *Attorney, Agent, or Firm*—Sheppard Mullin Richter & Hampton LLP

(57) ABSTRACT

System for processing programmable buttons using system control interrupts in a portable device. The system comprises a programmable button that comprises logic to generate a selected system control interrupt when actuated. The system also comprises interrupt logic coupled to receive the selected system control interrupt. The interrupt logic comprises logic to generate a button report that includes a button identifier, which indicates that the programmable button has been actuated. The system also comprises button support logic that is coupled to receive the button report, the button support logic comprises logic to determine a selectable device function associated with the button identifier, and logic to activate the selectable device function.

10 Claims, 3 Drawing Sheets

U.S. PATENT DOCUMENTS

| | | | |
|---|---|---|---|
| 6,323,873 B1* | 11/2001 | Liebenow | 345/619 |
| 6,429,855 B1* | 8/2002 | Pabon et al. | 345/172 |
| 6,446,153 B1* | 9/2002 | Cooper et al. | 710/260 |
| 6,496,891 B1* | 12/2002 | Cluff et al. | 710/260 |
| 6,598,169 B1* | 7/2003 | Warwick et al. | 713/320 |
| 6,606,716 B1* | 8/2003 | Vrhel et al. | 714/32 |
| 6,625,649 B1* | 9/2003 | D'Souza et al. | 709/225 |
| 6,678,830 B1* | 1/2004 | Mustafa et al. | 713/310 |
| 6,785,894 B1* | 8/2004 | Ruberg | 719/321 |
| 2001/0007117 A1* | 7/2001 | Cooper et al. | 710/129 |
| 2001/0020259 A1* | 9/2001 | Sekiguchi et al. | 710/260 |
| 2001/0022914 A1* | 9/2001 | Iura et al. | 400/472 |
| 2002/0104030 A1* | 8/2002 | Ahn | 713/310 |
| 2002/0186229 A1* | 12/2002 | Brown Elliott | 345/649 |
| 2003/0135534 A1* | 7/2003 | Nalawadi et al. | 709/100 |
| 2003/0210232 A1* | 11/2003 | Chen | 345/168 |
| 2004/0128496 A1* | 7/2004 | Vrhel et al. | 713/2 |

FOREIGN PATENT DOCUMENTS

| | | |
|---|---|---|
| JP | 06-085718 | 3/1994 |
| JP | 06-149437 | 5/1994 |
| JP | 06-289973 | 10/1994 |
| JP | 06-337746 | 12/1994 |
| JP | 07-283776 | 10/1995 |
| JP | 08-255044 | 10/1996 |
| JP | 09-116407 | 5/1997 |
| JP | 10-124240 | 5/1998 |
| JP | 10-187317 | 7/1998 |
| JP | 10-326124 | 12/1998 |
| JP | 11-338620 | 12/1999 |
| JP | 2000-155646 | 6/2000 |
| JP | 2001--056740 | 2/2001 |
| JP | 2001-265492 | 9/2001 |
| WO | WO 9705542 A2 * | 2/1997 |

OTHER PUBLICATIONS

Axelson, Jan, "USB Complete: Everything You Need to Develop Custom USB Peripherals," 1999, Lakeview Research, p. 191-216.*

Goodman, Steven D., et al., Personal Computer Waking Up Scheme for ACPI Operating System, Dec. 1, 1998, International Business Machines Corporation, p. 1.*

Tanenbaum, Andrew S., Structured Computer Organization, 1990, 3rd Edition, p. 11-13.*

"Stylistic 1200 Technical Reference Guide," 1998, Fujitsu, pp. 1-1 to 11-2.*

* cited by examiner

SYSTEM FOR PROCESSING PROGRAMMABLE BUTTONS USING SYSTEM INTERRUPTS

FIELD OF THE INVENTION

The present invention relates generally to user input systems, and more particularly, to a system for processing actuations of programmable buttons in a computer device using system control interrupts.

BACKGROUND OF THE INVENTION

Given the reduced size of many consumer electronic devices, packaging systems are becoming increasingly important. For example, cellular telephones are becoming smaller and smaller to satisfy consumer's desires for portable lightweight telephones that are easy to carry. Such devices must still provide all the features and functions consumers require. For example, portable computer systems must provide input and output ports, a display, and a user input device. Furthermore, the progression to smaller and smaller consumer devices with advanced features is extending to Personal Digital Assistants (PDAs) and notebook computers However, small consumer devices have problems that are typically not encountered by larger devices. For example, many small consumer devices are meant to be handheld, thereby making it easy for users to carry the devices and operate them at remote locations. These devices include user input devices, such as a touch pad, pen stylus and buttons to allow users to activate programs or input information.

In a typical computer system, various hardware devices may be provided with their own dedicated and non-shareable interrupt line that is used to activate their associated driver programs. However, this requires the computer system to have substantial interrupt resources. Furthermore, in a typical system, the interrupt resources are based on older architectures, referred to as "legacy" interrupts, which provide slow performance that can result in an unsatisfactory user experience with the device.

Another problem that exists affecting small handheld devices is that there are a limited number of buttons that can be accommodated by the device housing. Therefore, current handheld devices generally limit the types and numbers of functions that are available to a user via the buttons. For example, buttons may be used to activate application programs and make basic selections, however, these same buttons may not be used to process system level functions.

Another problem that exists affecting small handheld devices is that because they are small and designed to be carried by a user, it is easy for buttons to be accidentally depressed when handled. For example, a user may hold the device with one hand while inputting information with the other. The hand being used to hold the device may accidentally depress buttons on the device that activate other device functions. Thus, it is possible to inadvertently lose information or interrupt the operation of the device because of the accidental button press.

Therefore, it would be desirable to have a system to process button actuations in a small computer device that avoids the problems associated with conventional systems.

SUMMARY OF THE INVENTION

The present invention includes a system for processing programmable button actuations in a computer device using System Control Interrupts (SCI's). Using SCI's overcomes problems associated with conventional systems because these interrupts are shared interrupts so that multiple devices may use the same interrupt line. Thus, there is no need to have dedicated interrupt resources for each device, as in legacy architectures, that provide slow performance that can result in an unsatisfactory user experience.

For example, in one embodiment the system provides a multipurpose programmable button subsystem using the SCI's. The button subsystem allows for buttons to be selectably programmed to perform system level and application level functions.

In another embodiment, the system operates to receive and process programmable button actuations so as to prevent a user from disrupting the operation of the device because a button was inadvertently actuated. For example, in one embodiment the system provides a timing function to provide timing criteria to determine valid button actuations so that an inadvertent momentary button actuation will not activate any device functions.

In one embodiment included in the present invention, a system is provided to process actuations of a programmable button in a portable device. The device includes an operating system that operates to process one or more system control interrupts. The system comprises a programmable button that comprises logic to generate a selected system control interrupt when actuated. The system also comprises interrupt logic coupled to receive the selected system control interrupt. The interrupt logic comprises logic to generate a button report that includes a button identifier, which indicates that the programmable button has been actuated. The system also comprises button support logic that is coupled to receive the button report, the button support logic comprises logic to determine a selectable device function associated with the button identifier, and logic to activate the selectable device function.

In another embodiment of the present invention, a method is provided for processing actuations of a programmable button in a portable device. The device includes an operating system that operates to process one or more system control interrupts. The method comprises steps of generating a selected system control interrupt when a selected programmable button is actuated, receiving the selected system control interrupt, generating a button report that includes a button identifier for the selected programmable button, accessing a system registry to determine a selectable device function associated with the button identifier, and activating the selectable device function.

In another embodiment of the present invention, a tablet PC device is provided that includes a plurality of programmable buttons accessible at an outside surface of the device. The tablet PC includes an operating system that operates to process one or more system control interrupts. The tablet PC comprises logic to generate a selected system control interrupt when a selected programmable button of the plurality of programmable buttons is actuated. The tablet PC also comprises interrupt logic coupled to receive the selected system control interrupt, the interrupt logic comprises logic to generate a button report that includes a button identifier, which indicates that the selected programmable button has been actuated. The tablet PC also comprises button support logic that is coupled to receive the button report, the button support logic comprises logic to determine a selectable device function associated with the button identifier, and logic to activate the selectable device function.

BRIEF DESCRIPTION OF THE DRAWINGS

The foregoing aspects and the attendant advantages of this invention will become more readily apparent by reference to the following detailed description when taken in conjunction with the accompanying drawings wherein.

DETAILED DESCRIPTION OF THE INVENTION

The present invention includes a system for processing programmable buttons in a portable device. For example, in one embodiment the system provides a multipurpose programmable button subsystem using System Control Interrupts that allows for buttons to be selectably programmed to perform system level and application level functions. In another embodiment, the system operates to process programmable button actuations to prevent inadvertent actuations from disrupting the operation of the device. The following description describes the processing of programmable buttons associated with a handheld Tablet PC device, however, the system is suitable for processing programmable button actuations in virtually any type of device (handheld or stand alone) that processes input received from user actuated buttons.

Button Subsystem Operation

Figure 1:
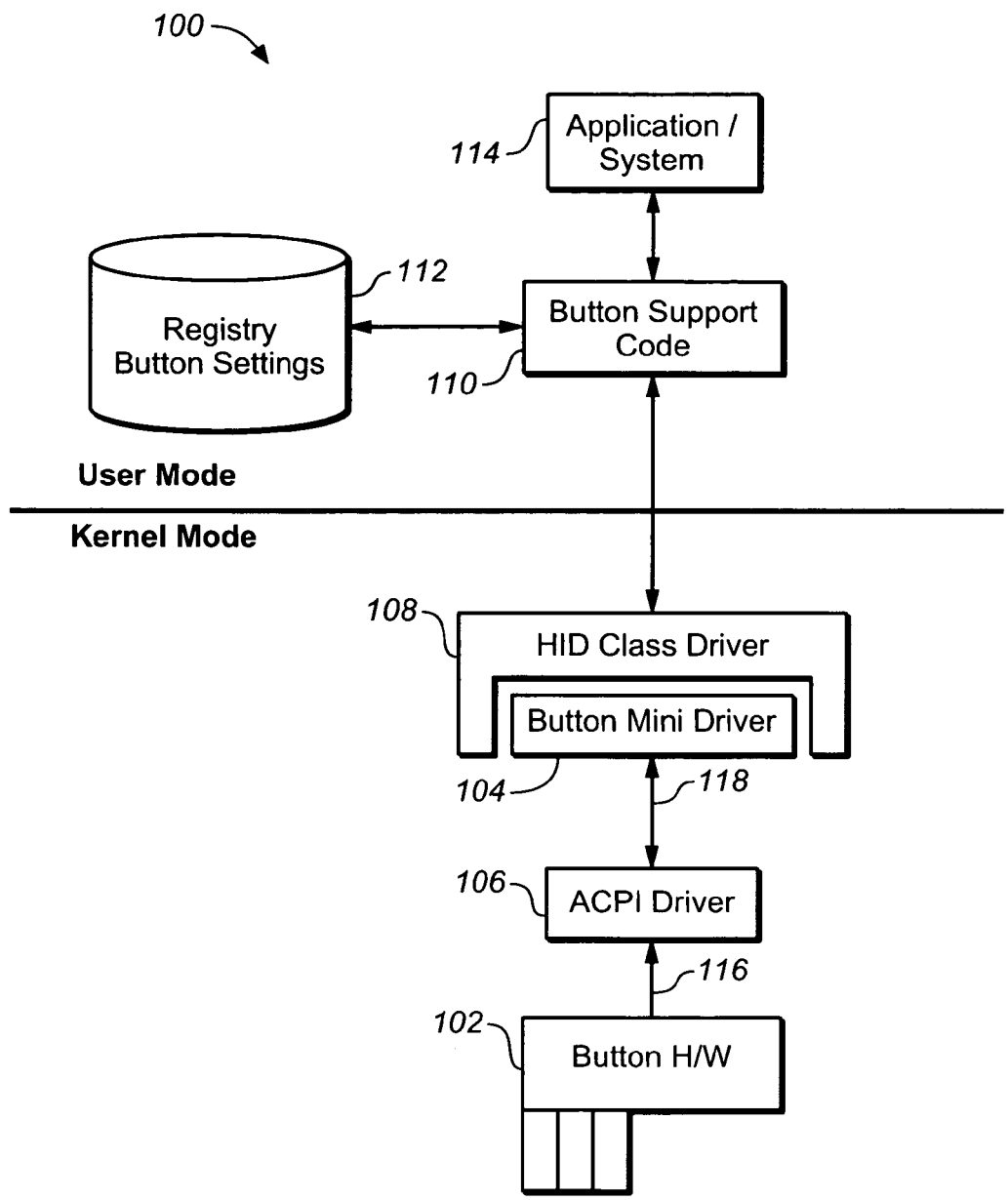
FIG. 1 shows a block diagram of one embodiment of a system for processing user input in accordance with the present invention.

FIG. 1 shows a block diagram of one embodiment of a system 100 for processing user input to a handheld device in accordance with the present invention. In the embodiment of FIG. 1, user mode and kernel mode functions of the device's operating system (OS) are shown. Button hardware (logic) 102 is designed to generate a System Control Interrupt (SCI) when a user actuates a button. For the purposes of this description, a button actuation occurs when a button is depressed, released, or some combination of both.

An SCI is used by the button hardware to notify an operating system having Advanced Configuration and Power Interface (ACPI) capability of ACPI events. The SCI is an active-low level, shareable interrupt that is used for raising fixed feature events to the operating system ACPI driver. An example of a fixed feature event is Lid Close/Lid Open in the case of a notebook computer, or a Power On/Off event.

However, in one or more embodiments included in the present invention, an SCI is used to raise an event that is mapped to a programmable button, and as a result, programmable feature events are mapped to a fixed feature event.

Upon initialization, a Human Input Device (HID) mini-driver 104 registers with the operating system's HID Class services and with an operating system provided advance configuration and power interface (ACPI) driver 106, to receive notification for button generated system control interrupts (SCI). The HID mini-driver 104 also reports button collection information to a HID class driver 108. When a user actuates (depresses) a button, an SCI 116 is generated by the button hardware 102 and input to the ACPI driver 106. The HID mini-driver 104 receives a notification 118 of the button SCI. The HID mini-driver 104 then reads a button status register (which indicates the status of the buttons) and provides an input report to the HID class driver 108, which communicates with a Button Support Code/Package.

A Button Support Code/Package (BSP) 110 is implemented in user mode. For example, in a case where the operating system is Windows 2000 or Windows XP Professional, the BSP is provided as a proprietary software package. In the case where the operating system is Windows XP Tablet Edition, the BSP may be provided by the operating system manufacturer. For example, the operating system may be provided by the Microsoft Corporation, who may also provides a BSP module referred to as WISP.

In one embodiment, the proprietary BSP 110 is a user mode HID client. Upon loading, it identifies and connects to the button collection reported from the button mini-driver 104. The BSP also reads button action mappings from a registry 112 to determine the function of buttons defined in the registry.

During operation, the BSP waits for button activity—that is, it waits for an input report to be generated by the button mini-driver 104 when the user actuates (presses or releases) a button. When the activity is detected, the BSP determines the action to be taken from the button action mapping in the registry 112, and executes the action. For the purposes of this description, it is assumed that any known technique for providing a registry that associates a button identifier with a device function can be used within the scope of the invention. Therefore, a detailed description of the registry will not be provided herein.

In one embodiment, the action to be taken upon the detection of a button actuation is to activate a system function or application level program 114. For example, in one embodiment, a programmable button is activates a system function, referred to as a Display Mode function, that controls whether the display contents are displayed on an internal LCD, an external CRT, or on both the LCD and the CRT. In a case where a programmable button is mapped (via the registry 112) to switch the display mode, when a user presses this button, the BSP determines the present display mode (LCD/CRT/both) and then switches to the next display mode. In one embodiment, in order to implement this function, the BSP interacts with Display Control Code (not shown) that is the application program interface (APD provided by the display driver vendor. It is also possible to program the registry so that a different display selection or display function is provided.

In another embodiment, the buttons are mapped via the registry 112 to have state-specific button mappings. For example, if a selected programmable button is actuated when a word processing program is active (i.e., in the foreground display window), a spell check function is launched. However, if the same button is actuated when a spreadsheet program is active, a formula is inserted in the present cell. Thus, the proprietary BSP 110 supports both system level and application level functions, so that virtually any programmable button can be programmed to perform virtually any function on the device, based on the current operating state (state characteristic) of the device.

In one embodiment, the system included in the present invention makes use of SCI's to provide a flexible programmable button interface that allows device buttons to perform a variety functions including system level functions and application level functions. This occurs while preserving interrupt resources since the SCI is a shareable interrupt.

Furthermore, the system overcomes the problems of performance and usability of legacy architectures.

In one embodiment of system operation, the following events occur when a programmable button is actuated.

1. A System Control Interrupt (SCI) is generated by button logic that detects the button actuation. For example, the button logic may be part of a proprietary application specific integrated circuit (ASIC)
2. The ASIC also provides the interrupt generation logic to generate either an SCI or a system management interrupt (SMI) upon a button press in the current context.
3. Information bits in certain registers of the ASIC are updated to reflect the button status (i.e., which button was pressed).
4. The SCI is fed to an I/O Controller Hub.
5. A General Purpose Event (GPE) status register corresponding to the SCI source is set (i.e., an event is raised to the operating system).
6. The GPE register blocks are owned by the operating system ACPI device driver, which then checks & passes control to the device driver that has registered to service this event (the Fujitsu HID Button Mini-driver in this case).

The ASIC contains registers that can be programmed to either generate SMI's or SCI's upon button presses. The system firmware/BIOS programs these registers to generate SMI's upon button presses prior to ACPI aware operating system bootup. During the transition to ACPI mode, the system BIOS reprograms these registers to generate SCI's upon button presses. As a result, the device buttons operate as programmable multipurpose buttons because they can be programmed to perform any of the following broad-based actions.

1. Keyboard emulation—The ability to emulate any keyboard key.
2. Mouse emulation—The ability to emulate mouse actions.
3. Application Launch—The ability to launch user-defined or pre-programmed applications or application functions.
4. System Software Configuration menu navigation.

An additional feature of the system is that the buttons can be programmed to generate SMI's or SCI's, thereby permitting the buttons to be used during BIOS setup (i.e. pre-operating system boot scenario) as well.

Figure 2:
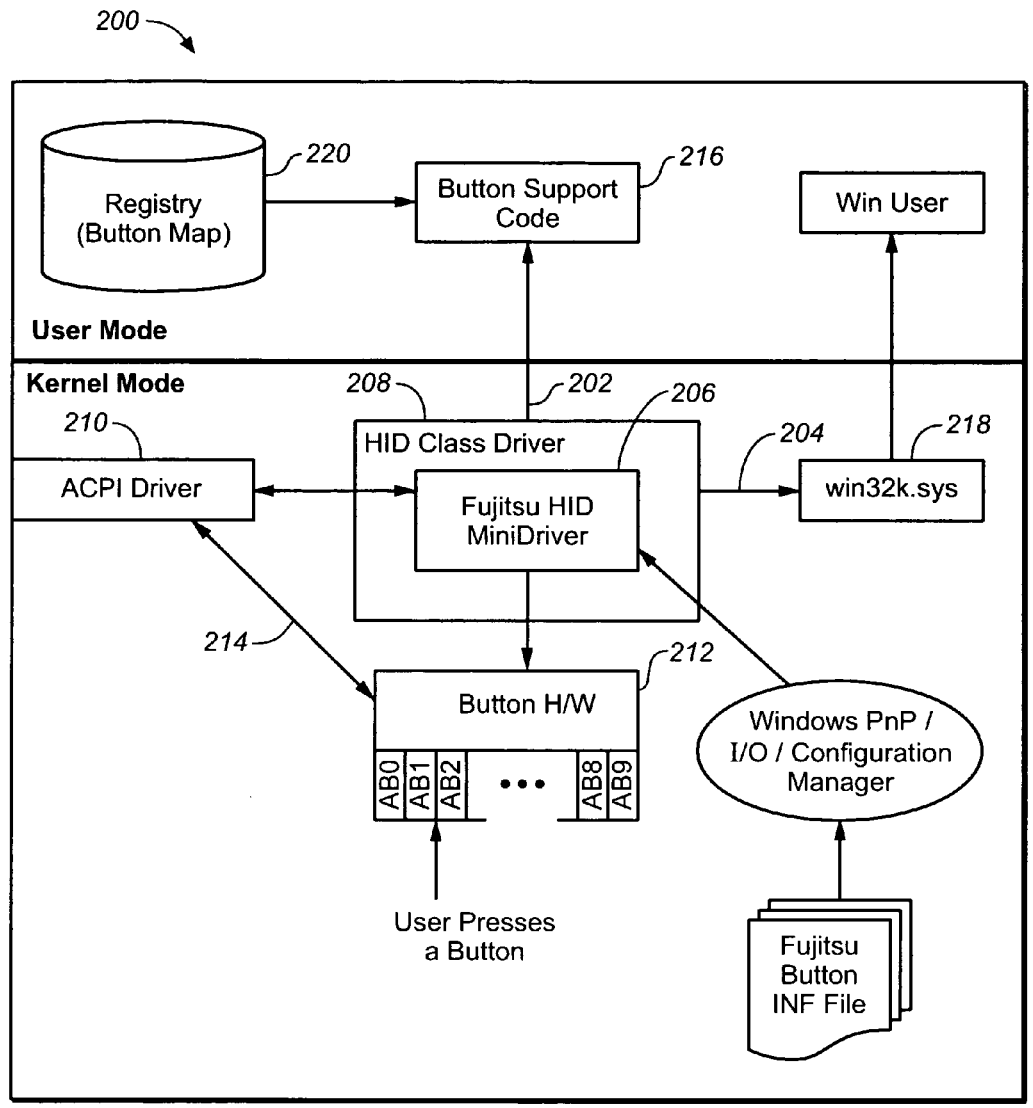
FIG. 2 shows a detailed block diagram of a system for processing button actuations in accordance with the present invention.

FIG. 2 shows a detailed block diagram of a system 200 for processing button actuations in accordance with the present invention. The system is suitable for use in a Tablet PC or other type of processing device that accepts input via user actuated buttons. In one embodiment, the system 200 implements two HID collections; namely, a Tablet PC button collection 202 and a keyboard button collection 204. The HID collections are a meaningful grouping of HID controls and their respective HID usage. A Report descriptor describes these two top-level collections and a report-item, associated with each collection, defines the HID report. The keyboard collection 204 may also be used for one or more buttons, with the Tablet PC Button collection 202 being used by the remainder of the Tablet PC buttons.

During initialization an HID mini-driver 206 registers with the HID class driver 208, and also registers a callback with an ACPI device driver 210 to get notification of SCI's generated by button hardware 212. When a user presses (actuates) a button, the hardware generates an SCI 214, which is trapped by the ACPI device driver 210. Since the HID mini-driver 206 is registered with the ACPI device driver 210 during the initialization, the ACPI device driver 210 invokes the callback. The HID mini-driver 206 then reads a hardware register associated with the buttons, and based on what is read, the mini-driver 206 constructs a HID report (button report) and passes that report over to either BSP 216, or a keyboard handler 218 (i.e., win32k.sys provided by Microsoft). In one situation, button information is passed to the BSP, which performs an associated task that is defined in the registry 220 for specific buttons.

In one embodiment, a button actuation is passed to the keyboard handler 218, which generates a CTRL+ALT+DEL sequence referred to as a Secure Attention Sequence (SAS), which may be, for example, a logon event. In one embodiment, the BSP 216 is a proprietary module, and in another embodiment, the BSP is provided by the operating system (i.e., a WISP subsystem provided by Microsoft). Thus, the system 200 provides programmable support for the buttons to activate both system level and application level functions.

Delayed Button Processing Mechanism

In one embodiment included in the present invention, a delayed button processing mechanism is provided. In this mechanism, a button actuation is registered only after the user presses and holds a button for more than a selectable time period, so that it is possible to validate a button actuation. For example, in one embodiment the selectable time period is about two seconds, or in the approximate range of 1–3 seconds. However, virtually any time period may be selected. In one embodiment, the mini-driver 206 implements this feature in software, hardware, or a combination of both. For example, an SCI is generated when a button is momentarily actuated, but the mini-driver does not generate a button report unless the button actuation is validated to meet the specified timing requirements. In one embodiment, the feature is implemented only for a selected button that controls specific system functions. However, this feature can be extended to a selected portion or all of the buttons associated with the device.

In practice, the usability of the button is considered before assigning the delayed button-processing feature. For example, if a button is assigned UP/DOWN arrow key movement, then such a button may not be appropriate to have such a delayed feature. Thus, the delayed button processing mechanism avoids the accidental launching of a program or function, since the user has to press and hold this button for a selected period of time before activation. For example, the user may momentarily depress the button while carrying the device, however, if the momentary actuation does not exceed the selected time period, the function assigned to the device will not be activated. This guarantees correct behavior of the button and avoids activating functions as a result of accidental button presses.

In case of the HID keyboard device driver, the driver implements a keyboard collection for the keys. The driver reports the key presses in terms of the HID report. When a selected key sequence, such as (Ctrl+Alt+Del) is reported, this report is intercepted by the win32k.sys driver, which then generates the SAS event.

Exemplary Implementation

The following is an exemplary implementation of a system for detecting button actuations in accordance with the present invention. This exemplary implementation is described with reference to a Tablet personal computer (PC) device that has multiple buttons accessible to a user at an outside front surface of the device, and that includes known hardware to run a typical operating system, such as Microsoft ® Windows 2000 Professional or Windows XP Professional.

Figure 3:
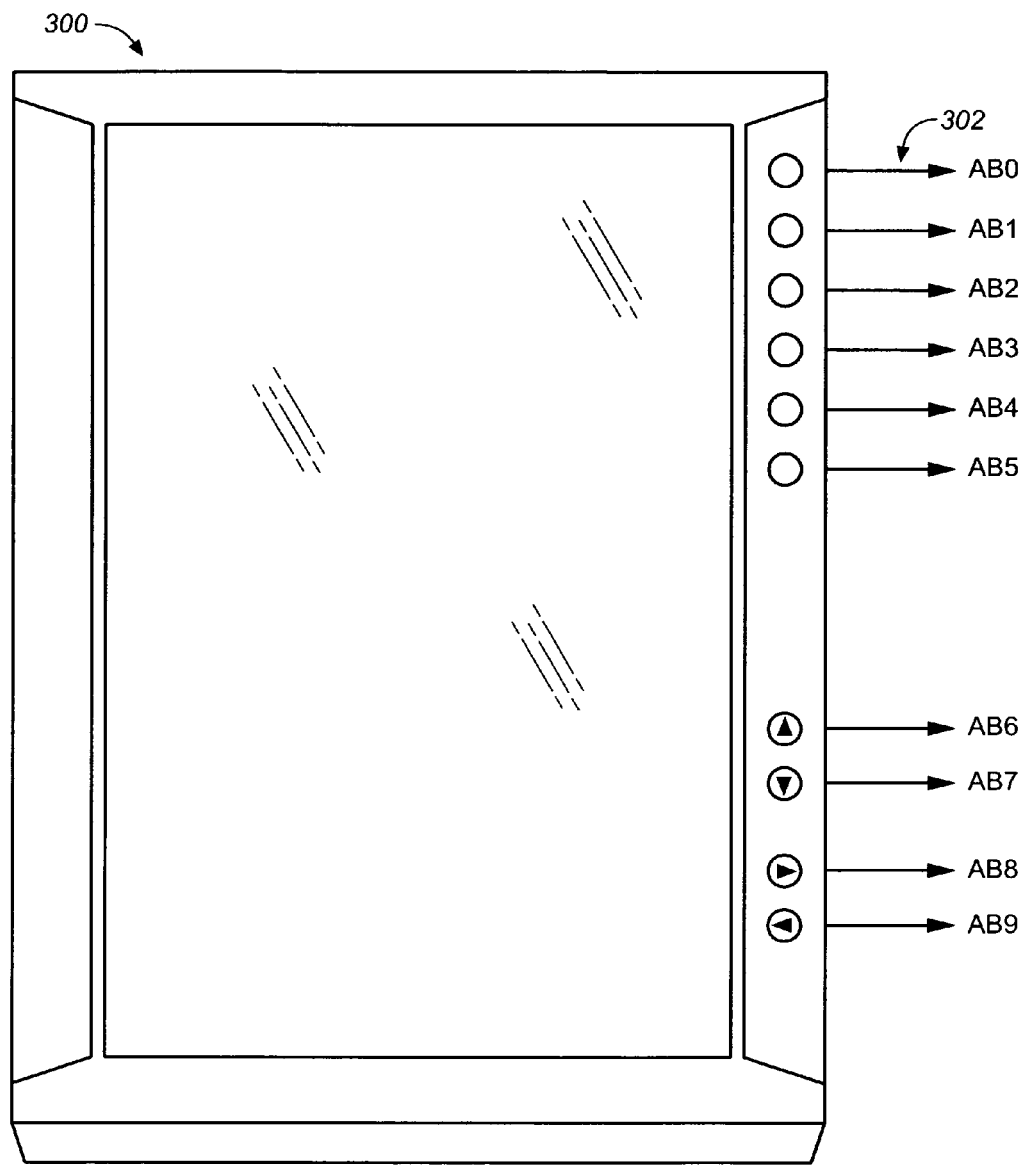
FIG. 3 shows a Tablet PC that includes one embodiment of a system for processing button actuations in accordance with the present invention.

FIG. 3 shows a Tablet PC 300 that includes one embodiment of a system for processing button actuations in accordance with the present invention. The PC 300 includes programmable buttons AB0–AB9, shown generally at 302, which are mounted on an outside surface of the device. As is well known in the art, a tablet PC is a portable computing device which, unlike a laptop or notebook computer, does not have a built-in keyboard. Thus, as depicted in FIG. 3, buttons AB0–AB9 are on the display frame, independent of a keyboard.

The buttons are programmed to have different functions assigned to them depending on the System State of the PC 300. In addition, the buttons are configured by the system firmware (BIOS) to generate two different types of interrupts, as described in the following table.

| System State | Interrupt Type | Interrupt Handler |
| --- | --- | --- |
| Pre-operating system boot | SMI | BIOS |
| Post-operating system boot | SCI | Operating System |

The following definitions apply to this exemplary implementation.
1. System Management Interrupt (SMI) is an interrupt that is transparent to the operating system and is handled by the system firmware/BIOS.
2. System Control Interrupt (SCI) is an interrupt that is handled by the ACPI-aware operating system.
3. Advanced Configuration & Power Interface (ACPI).
4. POST—Power-On Self-Test.
5. BIOS—Basic Input Output System.
6. SAS—Secure Attention Sequence.

Button Mappings

The following is a description of button mappings based on System State of the Tablet PC. A first system state occurs at pre-operating system boot, and a second system state occurs at post-operating system boot.

Pre-Operating System Boot—In this state, the buttons are primarily used to navigate the system firmware (BIOS) configuration menus & to select the operating system to boot (if there are multiple operating systems installed on the system hard disk drive. The primary role of the buttons in this system state is to emulate specific keyboard keys. For example, one possible mapping of the buttons is provided in the following table.

| Button | Navigation in BIOS Setup |
| --- | --- |
| AB0 | F2 to enter BIOS Setup Menu during POST |
| AB1 | F12 to enter Boot Option Menu during POST |
| AB2 | — |
| AB3 | Esc |
| AB4 | Ent |
| AB5 | F8 to enter Safe mode/other Operating system boot up options |
| AB6 | Arrow Up |
| AB7 | Arrow Down |
| AB8 | Arrow Right |
| AB9 | Arrow Left |

In the present example, only primary functions for the buttons are defined. There are also secondary functions, but these are considered disabled in this situation.

Post Operating System Boot—In this state, the buttons are typically used for logging onto the system (SAS), emulating some keyboard keys, and also for launching applications (user programmable). In this state, the buttons are defined to have both primary and secondary functions. The secondary functions are activated by pressing the Fn button and then pressing any other button within a selectable interval of time. This interval of time is as specified by the operating system Button Support Code/Package, and for example, may be on the order of two seconds. For example, in the case where the operating system is Windows XP or Windows 2000 Professional, the BSP is a proprietary module that determines the time interval. Furthermore, the button mappings may be slightly different from those shown for systems utilizing different digitizer technologies.

The following button definitions are provided for use with an active digitizer.

| Button | Primary | Secondary (Fn+) |
| --- | --- | --- |
| AB0 | Ctrl + Alt + Del | — |
| AB1 | Email | Internet |
| AB2 | Rotation | Display Mode (F10) |
| AB3 | Esc | Ctrl + Esc |
| AB4 | Enter | Alt |
| AB5 | Fn | Fn (Fujitsu Menu) |
| AB6 | Page Up | Tab Right |
| AB7 | Page Down | Tab Left |
| AB8 | Arrow Up | Arrow Right |
| AB9 | Arrow Down | Arrow Left |

In addition, pressing the AB5 (Fn button) twice activates a proprietary menu that provides a convenient way to access some frequently used system settings or programs. The following definitions define additional functions activated by double-pressing the function button (Fn+Fn).

| Application Launch |
| --- |
| Tablet Button Properties |
| Control Panel |
| Volume Control |
| Brightness Control |
| Power Management |
| Tablet PC Control Panel |
| TIP |

Passive Digitizer

The following button definitions are provided for use with a passive digitizer. In the following definitions the button mappings are slightly different, however, these distinctions are not relevant to the embodiments of the invention.

| Button | Primary | Secondary (Fn+) |
| --- | --- | --- |
| AB0 | Ctrl + Alt + Del | — |
| AB1 | Right Click | Hovering Mode |
| AB2 | Rotation | Display Mode (F10) |
| AB3 | Esc | Ctrl + Esc |
| AB4 | Enter | Alt |
| AB5 | Fn | Fn (Proprietary Menu) |
| AB6 | Page Up | Tab Right |
| AB7 | Page Down | Tab Left |
| AB8 | Arrow Up | Arrow Right |
| AB9 | Arrow Down | Arrow Left |

The present invention includes a system for processing actuations of programmable button in a portable device using system control interrupts. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. A computing device comprising:
   a plurality of programmable buttons that are independent of a computer keyboard, each of said buttons being configured to generate a system control interrupt (SCJ) when actuated;
   an operating system comprising an Advanced Configuration and Power Interface (ACPI) driver capable of processing SCIs received from said programmable buttons and generating a corresponding notification;
   a button driver for processing the notification from said ACPI driver and for generating a report; and
   a button support package which implements a desired action in response to said report based on how the button has been programmed,
   wherein at least one of said buttons is adapted to generate a system management interrupt (SMI) while the operating system is being loaded, such that a desired action can be implemented prior to the time the ACPI driver is loaded.

2. The computing device of claim 1, wherein one of said programmable buttons can be used to rotate the orientation of a display associated with the computing device.

3. The computer of device of claim 1 wherein said device is a tablet computer.

4. The computing device of claim 1 wherein said button diver comprises a human input device (HID) button mini-diver and an HID class diver.

5. The computing device of claim 4 wherein said operating system has a kernel mode and a user mode, and wherein said button driver operates in the kernel mode.

6. The computing device of claim 5 wherein said button support package operates in the user mode.

7. The computing device of claim 1 wherein said computing device is capable of running multiple applications programs and at least one of said buttons is programmed such that the action which is implemented in response to the actuation of said button is a function of the application program that is currently active.

8. The computing device of claim 1 wherein said at least one of said buttons is user programmable.

9. The computing device of claim 1 wherein an action associated with at least one of said buttons is not implemented unless the button is actuated for a predetermined period of time.

10. The computing device of claim 1, further comprising a display having a display frame at the periphery thereof, and wherein said plurality of programmable buttons are positioned on said display frame.

* * * * *